United States Patent [19]

Hayami

[11] 4,024,554
[45] May 17, 1977

[54] FOCAL PLANE FOR PHOTOGRAPHIC CAMERAS
[75] Inventor: Tadao Hayami, Tokyo, Japan
[73] Assignee: Copal Company Limited, Tokyo, Japan
[22] Filed: Sept. 30, 1975
[21] Appl. No.: 618,241
[30] Foreign Application Priority Data
Oct. 3, 1974 Japan ............... 49-119507
[52] U.S. Cl. ............... 354/242; 354/152; 354/154; 354/244; 354/288
[51] Int. Cl.² ............... G03B 9/32
[58] Field of Search .......... 354/152, 154, 226, 241, 354/242, 243, 244, 288, 354
[56] References Cited
UNITED STATES PATENTS

| 3,045,572 | 7/1962 | Kinnard | 354/241 |
| 3,440,943 | 4/1969 | Saur | 354/241 |
| 3,812,513 | 5/1974 | Berk et al. | 354/241 |

FOREIGN PATENTS OR APPLICATIONS

| 1,340,981 | 12/1973 | United Kingdom | 354/244 |

Primary Examiner—Russell E. Adams, Jr.
Attorney, Agent, or Firm—Cushman, Darby & Cushman

[57] ABSTRACT

A photographic camera comprising a pair of winding shafts arranged below an exposure aperture, a pair of unwinding shafts arranged above a photographing lens, a front curtain and rear curtain each secured at one end to the winding shaft and at the other end to the unwinding shaft, and guide rollers for changing the running directions of the front and rear curtains so that a housing space in the camera body may be small.

3 Claims, 7 Drawing Figures

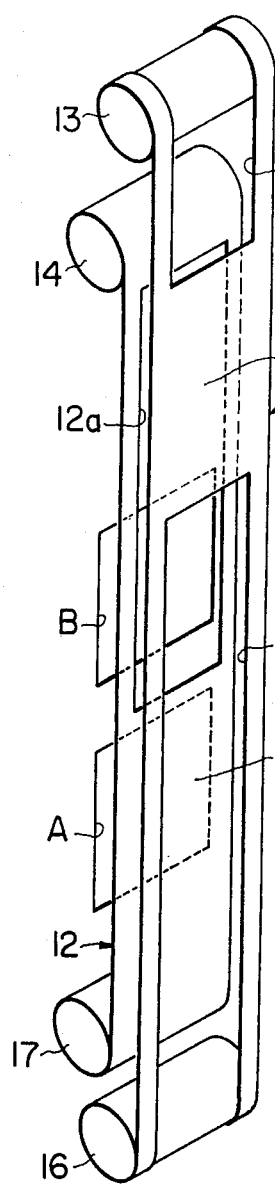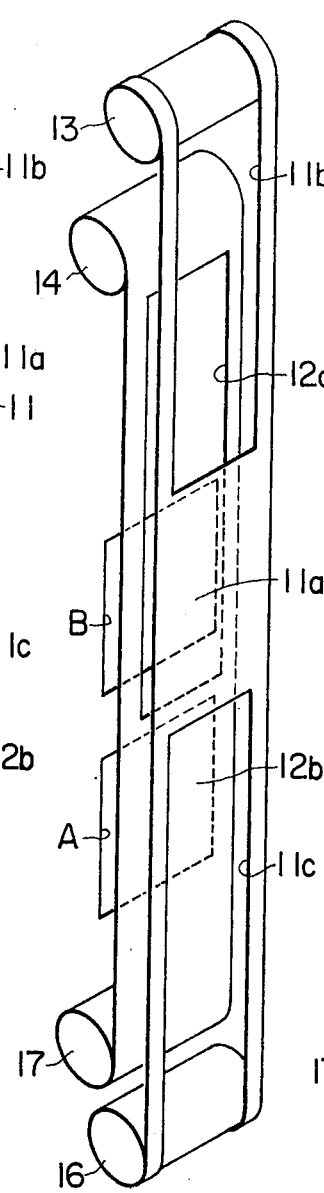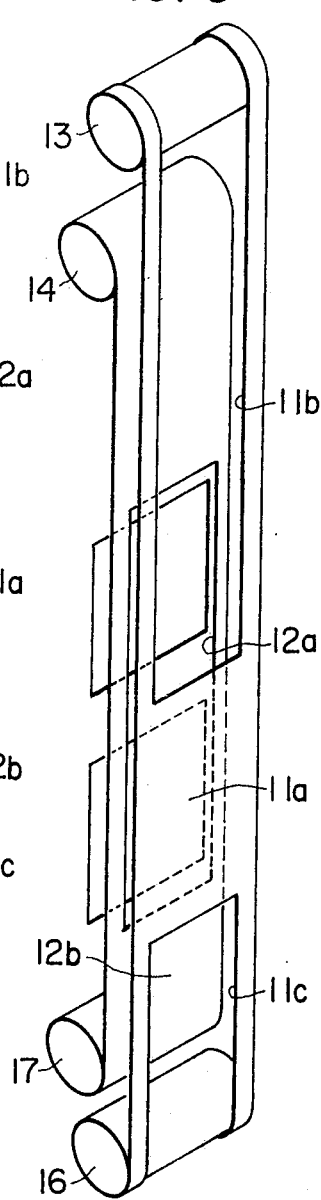

४,०२४,५५४

FOCAL PLANE FOR PHOTOGRAPHIC CAMERAS

BACKGROUND OF THE INVENTION a. Field of the invention

The present invention relates to a focal plane shutter for photographic cameras and more particularly to an improvement in a focal plane shutter of a type having a front curtain and rear curtain.

b. Description of the Prior Art

A focal plane shutter of a type having a front curtain and rear curtain is conventionally fitted particularly to a high class single-lens reflex camera or the like but, as a comparatively large space is required to fit such focal plane shutter, it has been impossible to fit it to a small camera or particularly to a pocket size camera.

SUMMARY OF THE INVENTION

A primary object of the present invention is to provide such focal plane shutter of a type having a front curtain and rear curtain as can be fitted to such extremely small camera as a pocket size camera.

Another object of the present invention is to provide a pocket size camera which can be formed as a single-lens reflex camera.

These and other objects of the present invention will become more apparent during the course of the following detailed description and appended claims.

BRIEF DESCRIPTION OF THE DRAWINGS

FIGS. 3, 4 and 5 are explanatory views showing the relative positions of a front curtain and rear curtain in case the shutter is respectively uncocked, being cocked and cocked;

DESCRIPTION OF THE PREFERRED EMBODIMENT

Figure 1:
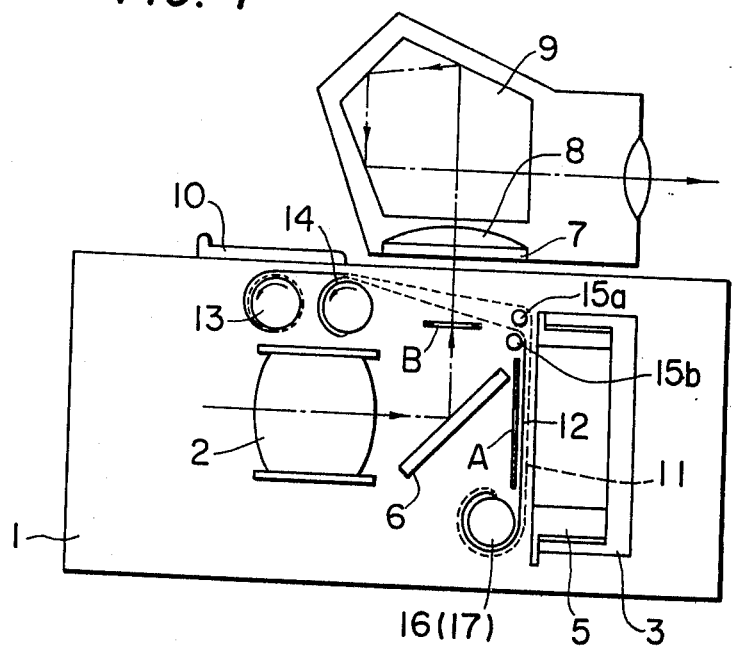
FIG. 1 is an explanatory view showing a fundamental formation of a pocket size camera incorporating a focal plane shutter according to the present invention.

In FIG. 1 showing a shutter of the present invention incorporated in a pocket size camera as uncocked, numeral 1 signifies a body of the camera, numeral 2 signifies a photographing lens, numeral 3 signifies a film cartridge, numeral 5 signifies a receiving frame for the film cartridge 3, numeral 6 signifies a mirror mechanism operating in a so-called quick return system, numeral 7 signifies a focusing glass, numeral 8 signifies a condenser lens and numeral 9 signifies a pentaprism. The focusing glass 7, condenser lens 8 and pentaprism 9 form a finder unit of the camera. Numeral 10 signifies a light shielding plate to cover an opening formed on the camera body 1 so that dust or the like may not enter the camera, for example, after the finder unit is removed, by being slid on the camera body 1 when said finder unit is removably set on the camera body 1. Numeral 11 signifies a front curtain and numeral 12 signifies a rear curtain. In each of them, the part shown by the solid line represents a shielding portion and the part shown by the broken line represents an open portion. Numeral 13 signifies a front curtain unwinding shaft and numeral 14 signifies a rear curtain unwinding shaft. Each of them is rotatably supported on the camera body and is normally biased in the direction indicated by the arrow by a spring not illustrated. Numerals 15a and 15b signify guide rollers rotatably mounted on the camera body 1 to change the running courses of the front curtain 11 and rear curtain 12, respectively. Numerals 16 and 17 signify respectively front curtain and rear curtain winding shafts supported rotatably and coaxially on the camera body 1 and having separate winding and locking means.

Symbol A signifies an exposure aperture opened only at the time of the exposure but normally closed by the shutter curtains. Symbol B signifies a viewing aperture opened normally but closed only at the time of winding up the shutter and of the exposure by the shutter curtains.

Figure 2:
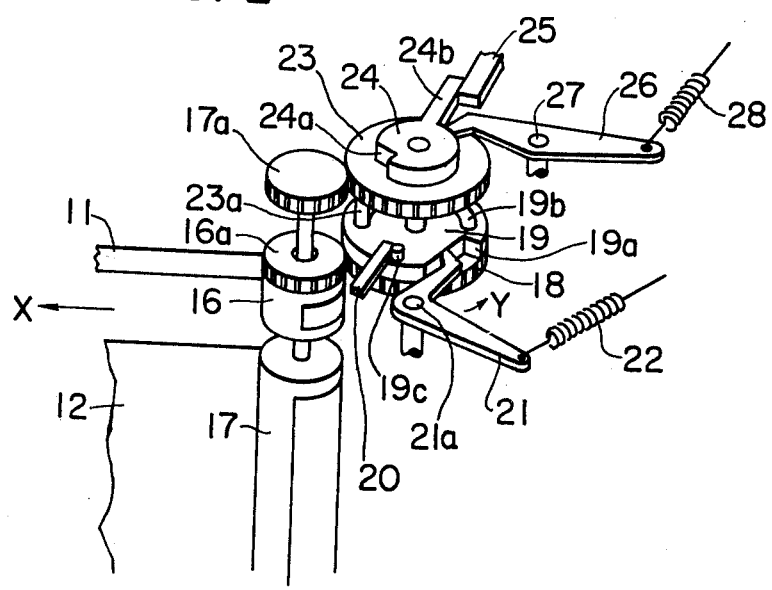
FIG. 2 is a perspective view showing an embodiment of the winding up mechanism for the focal plane shutter according to the present invention.

In FIG. 2 showing a shutter winding mechanism used as a driving means for the shutter of the present invention as uncocked, the front curtain 11 is fixed at one end to the winding shaft 16 mounted rotatably on the camera body 1 and is always pulled in the direction indicated by the arrow X by a spring not illustrated. Numeral 16a signifies a pinion formed integrally with the winding shaft 16 rotatably supported by the camera body 1. Numeral 18 signifies a gear supported rotatably on the camera body 1 and meshing with the pinion 16*l*. Numeral 19 signifies a cam plate formed integrally with the gear 18 and having a hook portion 19a, an arcuate groove 19b and a pin 19c. Numeral 20 signifies a stopper secured to the camera body 1 to retain the cam plate 19 in the illustrated position through the pin 19c while the shutter is uncocked. Numeral 21 signifies a front curtain locking lever mounted rotatably on a shaft 21a fixed on the camera body 1 and biased counterclockwise by a spring 22 so as to be always pressed against the side surface of the cam plate 19. The rear curtain 12 is secured at one end to the winding shaft 17 supported rotatably on the camera body 1 and is always pulled in the direction indicated by the arrow X by a spring not illustrated. Numeral 17a signifies a pinion formed integrally with the winding shaft 17. Numeral 23 signifies a gear mounted rotatably on the camera body 1, meshing with the pinion 17a and set concentrically with the gear 18. Numeral 23a signifies a pin formed integrally with the gear 23 and fitted in the arcuate groove 19b in the cam plate 19. Numeral 24 signifies a cam plate formed integrally with the gear 23 and having a hook portion 24a and an arm 24b. Numeral 25 signifies a stopper secured to the camera body to retain the cam plate 24 in the illustrated position through the arm 24b while the shutter is uncocked. Numeral 26 signifies a rear curtain locking lever supported rotatably on a shaft 27 fixed on the camera body 1, biased counterclockwise by a spring 28 and arranged so as to be normally pressed against the side surface of the cam plate 24.

When the gear 18 is rotated in the direction indicated by arrow Y by a member not illustrated, the front curtain 11 will be wound up against a spring not illustrated but the rear curtain will not move unless the pin 23a engages with the end portion of the arcuate groove 19b. When the front curtain 11 runs for a predetermined distance to such position as is shown in FIG. 4 (that is to say, when the pin 23a contacts the end portion of the arcuate groove 19b), the arcuate groove 19b will begin to push the pin 23a and then, when the rear curtain 12 is wound up until the locking levers 21 and 26 overpass the hook portions 19a and 24a, respectively, the winding up will be completed and the clockwise rotation of the cam plates 19 and 24 by the returning forces of springs not illustrated will be locked by the engagement of the locking levers 21 and 26 with the hook portions 19a and 24a of the cam plates 19 and 24, respectively, to keep the shutter cocked.

FIGS. 3, 4 and 5 shown in turn the positions of the shutter curtains 11 and 12 (that is to say, the exposure aperture A and viewing aperture B as opened and closed by the shutter curtains) when the shutter is uncocked, is being cocked and is cocked as modified so as to be convenient to explain. That is to say, in these drawings, the front curtain 11 and the rear curtain 12 are shown as linearly extended and the winding shafts 16 and 17 are shown as parallel columns arranged at a spacing. Further, the exposure aperture A and viewing aperture B are shown in the same plane closer to each other than in fact. In FIGS. 3, the front curtain 11 has a shielding portion 11a and open portions 11b and 11c formed in the lengthwise direction with said shielding portion 11a between them and is secured at the respective ends to the unwinding shaft 13 and winding shaft 16. In the state in FIG. 3, the shielding portion 11a is deviated from the viewing aperture B to open it. On the other hand, the rear curtain 12 has an open portion 12a and shielding portion 12b and is secured at the respective ends to the unwinding shaft 14 and winding shaft 17. While the shutter is uncocked as shown in FIG. 3, the shielding portion 12b will keep the exposure aperture closed. Therefore, in this state, the film will be shielded by the rear curtain 12 and an image will be seen in the finder unit.

Further, when the shutter is to be wound up, if the shutter is cocked by a cocking member not illustrated, by such mechanism as is exemplified in FIG. 2, first only the winding shaft 16 will rotate clockwise to wind up the front curtain 11 until the lower end edge of the shielding portion 11a overlaps on the lower end edge of the open portion 12a of the rear curtain (See FIG. 4). Thereafter, the front and rear curtains 11 and 12 will be wound up together to reach the cocked position in FIG. 5 and will be locked in said position by the locking levers 21 and 26, respectively.

The exposure is made by first clockwise rotating the front curtain locking lever 21 against the spring 22. That is to say, when the front curtain 11 is unlocked, it will begin to run due to the returning force of a spring not illustrated acting on the unwinding shaft 13. Thus, after the lapse of a predetermined time, the rear curtain locking lever 26 will be rotated clockwise against the spring 28 to unlock the rear curtain 12 and at the same time the rear curtain will begin to run.

The front curtain 11 will stop when the pin 19c contacts the stopper 20 and the rear curtain 12 will stop when the arm 24b contacts the stopper 25 to return to the states in FIGS. 2 and 5 to complete one exposure.

As evident from the above description, the film will be always covered with either of the front curtain 11 and rear curtain 12 while the curtains are being wound up and will be covered with the front curtain when they are completely wound up.

On the other hand, the viewing aperture B will be kept open except that it will be temporarily shielded by the shielding portion 11a during the winding up and will have the light passage interrupted by the leap up of the mirror at the time of the exposure. Therefore, in practice, the use of the finder will not be obstructed.

As described above, according to the present invention, the running passage of the curtain type focal plane shutter running in the vertical direction is bent and therefore the shutter fitting space can be made so small that the shutter can be fitted without impairing the portability of the pocket camera.

Figure 6:
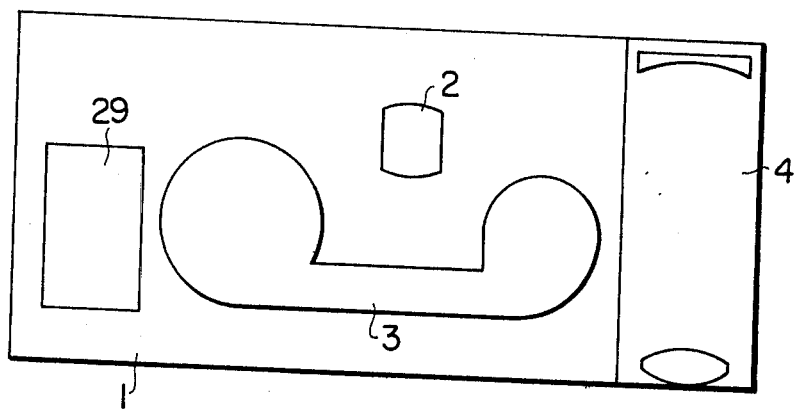
FIG. 6 is a schematic view showing the arrangements of a photographing lens, film cartridge, view finder and current source battery in a known pocket size camera.
Figure 7:
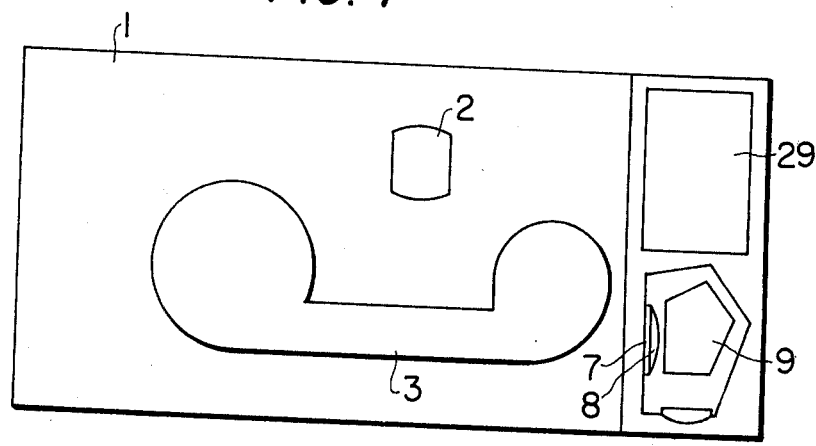
FIG. 7 is a schematic view corresponding to FIG. 6 of a pocket size camera incorporating a shutter according to the present invention

In FIG. 6 which is an arrangement view of a general conventional pocket size camera, numeral 4 signifies a view finder and numeral 29 signifies a current source battery. However, if the photographic camera is made to be of a single-lens reflex system and the finder unit is removably mounted on the camera body 1 as in the present invention, not only the performances of the pocket size camera will be able to be more improved but also said finder unit will be able to be housed in the finder unit setting space in the convenional pocket size camera as shown in FIG. 7 when the finder unit is not being used and therefore the total size of the pocket size camera will not be different from that of the conventional one. Further, according to the present invention, the current source battery 29 can be also housed in the finder unit setting space in the conventional pocket size camera and therefore the size of the entire camera can be made smaller.

I claim:
1. A photographic camera comprising:
a camera body therein including a photographing lens, an exposure aperture formed behind said photographing lens, and a viewing aperture formed in a plane intersecting rectangularly with a plane including said exposure aperture:
a pair of winding shafts and a pair of unwinding shafts respectively rotatably supported on said camera body, one pair being arranged below said exposure aperture and the other pair being arranged above said photographing lens;
a front curtain secured at one end to one of the winding shafts of said pair and at the other end to one of the unwinding shafts of said pair and having a shielding portion and a pair of open portions formed in the lengthwise direction on both sides of said shielding portion;
a rear curtain secured at one end to the other of the winding shafts of said pair and at the other end to the other of the unwinding shafts of said pair and having a shielding portion and an open portion formed in the lengthwise direction adjacently to said shielding portion; and
at least one guide roller supported rotatably on said camera body and engaged with said front curtain and rear curtain to change the running direction of said front curtain and rear curtain, said viewing aperture being kept open except at the time of winding up said front curtain and rear curtain and running them for the exposure,
wherein said photographic camera further comprises a finder unit mounted removably on said camera body and coordinated with said viewing aperture.

2. A photographic camera according to claim 1 wherein said photographic camera further comprises a light shielding plate slidably mounted on said camera body so as to be able to cover the camera body portion on which said finder unit had been mounted when said finder unit has been removed from the camera body.

3. A photographic camera according to claim 2 wherein said photographic camera has a space defined within said camera body and capable of housing said finder unit.

* * * * *